9326X
E. Brown.
Thrashing Mach.
Patented Jan. 20, 1836.
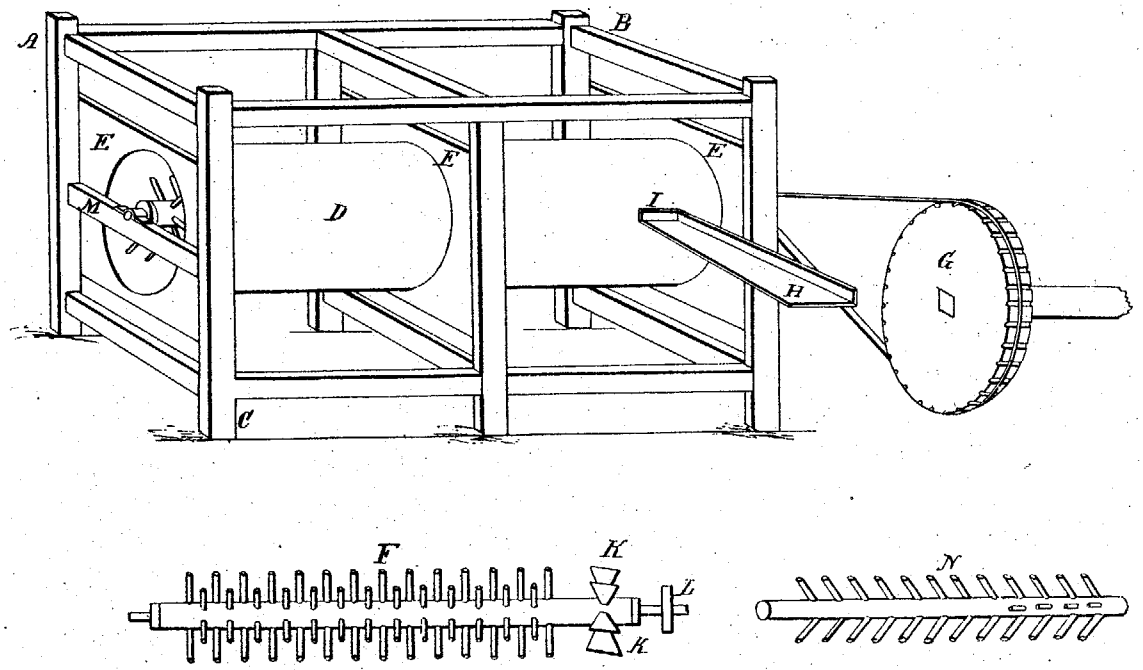

9326X Jan. 20. 1836 [illegible] 13

~~Elon~~ Eleazar Brown, of Chenango, New York

Letters Patent

The schedule referred to in these Letters Patent and making part of the same containing a description in the words of the said Eleazar Brown himself of his improvement in the Machine for Thrashing Wheat and other grain. To all to whom these presents shall come Be it known that I Eleazar Brown of Chenango in the County of Broome and State of New York have invented a new and useful Threshing Machine; and that the following is a full and exact descrip-tion of the construction and operation of the said machine as invented by me reference being had in said description, to the annexed drawing A. B. C, is a stout wooden frame about six feet high and eight feet long, a substantial panel partly encloses each end, & a similar one passes through the centre of the frame, these panels are marked C. A hole of suitable size is cut through each panel and the trunk or cylinder, D, inserted, this cylinder may be made of wood or metal and should be about three feet in diameter firmly embraced by and secured to the panels. The shaft F. has four fans or wings placed transversely at its head marked K and is armed with beaters or wooden pins made square and passing through the shaft at right angles or other-wise as seen at A; and may either contain four rows of pins or less, this shaft is inserted in the cylinder and the gudgeons secured in the boxes placed on cross timbers at each end of the frame marked aE.

Horse, steam or other power is applied to the drum G. which com-municates an accelerated motion to the shaft by a band on the small button L. near the head of the cylinder and below the fans is a horizontal opening to which is fixed the apron H. the operation of threshing wheat or other grain is performed by placing a sheaf upon the apron and feeding the machine through the aperture I. the rapid motion of 18th 9326X the shaft quickly separates the grain and the strong current of air driven through the cylinder by the fans carries out the straw and grain Witnesses
Ira Park,
B. H. Crane Eleazar Brown 403 ads Ex
Chf.

Drawing